INVENTOR
B. T. TUCKER
BY Robert J. Zinn
ATTORNEY

June 10, 1969 B. T. TUCKER 3,449,722

ELECTRONIC MULTIPROCESSING APPARATUS INCLUDING COMMON QUEUEING TECHNIQUE

Filed May 2, 1966

INVENTOR
B. T. TUCKER

BY Robert J. Zinn

ATTORNEY

INVENTOR
B. T. TUCKER
BY Robert S. Zinn
ATTORNEY

United States Patent Office 3,449,722
Patented June 10, 1969

3,449,722

ELECTRONIC MULTIPROCESSING APPARATUS INCLUDING COMMON QUEUEING TECHNIQUE

B. T. Tucker, Waltham, Mass., assignor to Honeywell Inc., Minneapolis, Minn., a corporation of Delaware Filed May 2, 1966, Ser. No. 546,802
Int. Cl. G11b *13/00*
U.S. Cl. 340—172.5 7 Claims

ABSTRACT OF THE DISCLOSURE

A queueing technique for utilization in a multiprocessor-multiprogramming environment wherein the plurality of processor sections are organized so that each processor section handles a particular type of instruction; means being provided for directing instructions in the form of program requests from the various programs to central control means wherein the program requests are scanned and temporarily stored, awaiting the avilability of the appropriate processor section; the queueing arrangement serving in common the plurality of processor sections and including means for chaining requests directed to a particular processor so as to insure that upon becoming available, a processor section will be presented with the program request therefor which has resided longest in the common queue.

The present invention is concerned with a new and improved data processing system. More specifically, the present invention is directed to a new and improved data processing system capable of effecting multiprocessing operations and provided with a unique queueing arrangement to enable the multiprocessing operations to be effected in a new and highly efficient manner.

In the natural evolution of data processing systems, it was recognized at an early stage of their development that greater operating efficiencies could be achieved by enabling a system to simultaneously handle a plurality of programs or program segments. Systems characterized by a single arithmetic unit which have the ability to simultaneously execute instructions from two or more programs by interleaving the instructions therefrom are commonly referred to as multiprogramming systems. Under certain programming conditions in a multiprogramming system, it is possible to have a mode of operation wherein two or more programs may be calling for a particular peripheral device at the same time. In the patent to William M. Kahn, et al. entitled "Data Processing Apparatus" which issued Oct. 26, 1965 as U.S. Patent 3,214,737, there is disclosed a system for recognizing that a particular peripheral device is busy, and "first-off" means actuated upon detection of such condition, for storing the identity of the first program calling for the particular peripheral device. Upon release of the busy peripheral device, the "first-off" means are referenced to provide the identity of the next program waiting to use the peripheral device.

Subsequent to the introduction of the original multiprogramming techniques, more sophisticated multiprocessing systems have been proposed, these systems are characterized by multiple arithmetic and logic units for simultaneously effecting operations representing the demands of a plurality of programs. Of the variety of multiprocessing techniques which have been proposed, most are characterized by the association of a particular program with a single processing segment. Accordingly, a distinguishing feature of the present system is the provision of a plurality of specialized processing sections each of which is designed to efficiently handle a limited repertoire of instructions. Any attempt to divide the instruction repertoire among a set of synchronous subprocessors requires additional hardware which can only be justified upon the realization of increased operating efficiencies. It follows that the instructions comprising a particular program will be distributed to the various processing sections in accordance with the ability of the latter to efficiently execute the processing thereof.

Accordingly, it is a primary object of the present invention to provide a data processing apparatus adapted to effect multiprocessing operations wherein the instructions comprising a particular program are allocated to the multiple processor sections in accordance with the ability of each of the latter to efficiently execute these instructions.

In the implementation of the proposed invention, means are provided to scan incoming requests to ascertain the identity of the requested processor as well as the availability thereof. In an instance where the requested processor section is busy, a queueing scheme is provided to store information identifying the current as well as all subsequent requesting programs. A technique currently receiving considerable attention, and one possibly capable of accommodating the queueing problem, is the associative memory technique. Although theoretically appealing, in actual practice associative memories are at present unsuited to do the job at hand due to their relatively high cost and slow access time.

It is therefore a more specific feature of the present invention to provide a new and improved queueing scheme for a multiprocessing system wherein those program requests which cannot be immediately honored are temporarily stored, so that upon the freeing of an originally busy processor section, the oldest queued program request for the particular processor section will be honored.

The use of queueing techniques for the purpose of buffering information to the input of an assimilating device is well known. In such arrangements, a plurality of information sources channel their outputs into a queueing device which in turn transfers the information in order into a central unit such as a processor or memory store. It follows from the above that in a multiprocessor system or in a system having a multisegmented memory, each section would be serviced by a separate queue. To avoid an undue expenditure of hardware, it is herein suggested that the function of the plurality of queues in the prior art be substituted for by a common queue having the capability of establishing a string of requests relative to each of the processor sections comprising the data processing system.

It is therefore another more specific object of the present invention to provide a common queue for the purpose of servicing a plurality of independent processor sections.

The advantages of the proposed system are obvious with respect to the hardware expenditure required to accommodate all of the requests for the plurality of processor sections. In the prior art arrangement involving separate queues associated with each processor section, it is possible that a single processor could be concurrently handling the bulk of requests from the active programs. It would thus be necessary to provide each processor section with a queue of sufficient size to accommodate the maximum number of requests possible of being concurrently generated for the associated processor section. However, in accordance with the proposed system organization, the total hardware commitments to the common queue would not significantly exceed that which is required to implement any one of the plurality of queues servicing the separate processor sections. This follows from the fact that other design considerations limit the total number of requests which might possibly be awaiting processing in all of the processor sections. It is possible that in the proposed system the bulk of the accumulated requests could be directed to a single processor; however, because of the aforementioned design considerations, the number of concurrent requests for the other processor sections would in turn be limited.

Thus, another more specific object of the present invention is the provision of a common queueing technique characterized by an efficiency of design which is particularly relevant to the total hardware requirements of the system.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
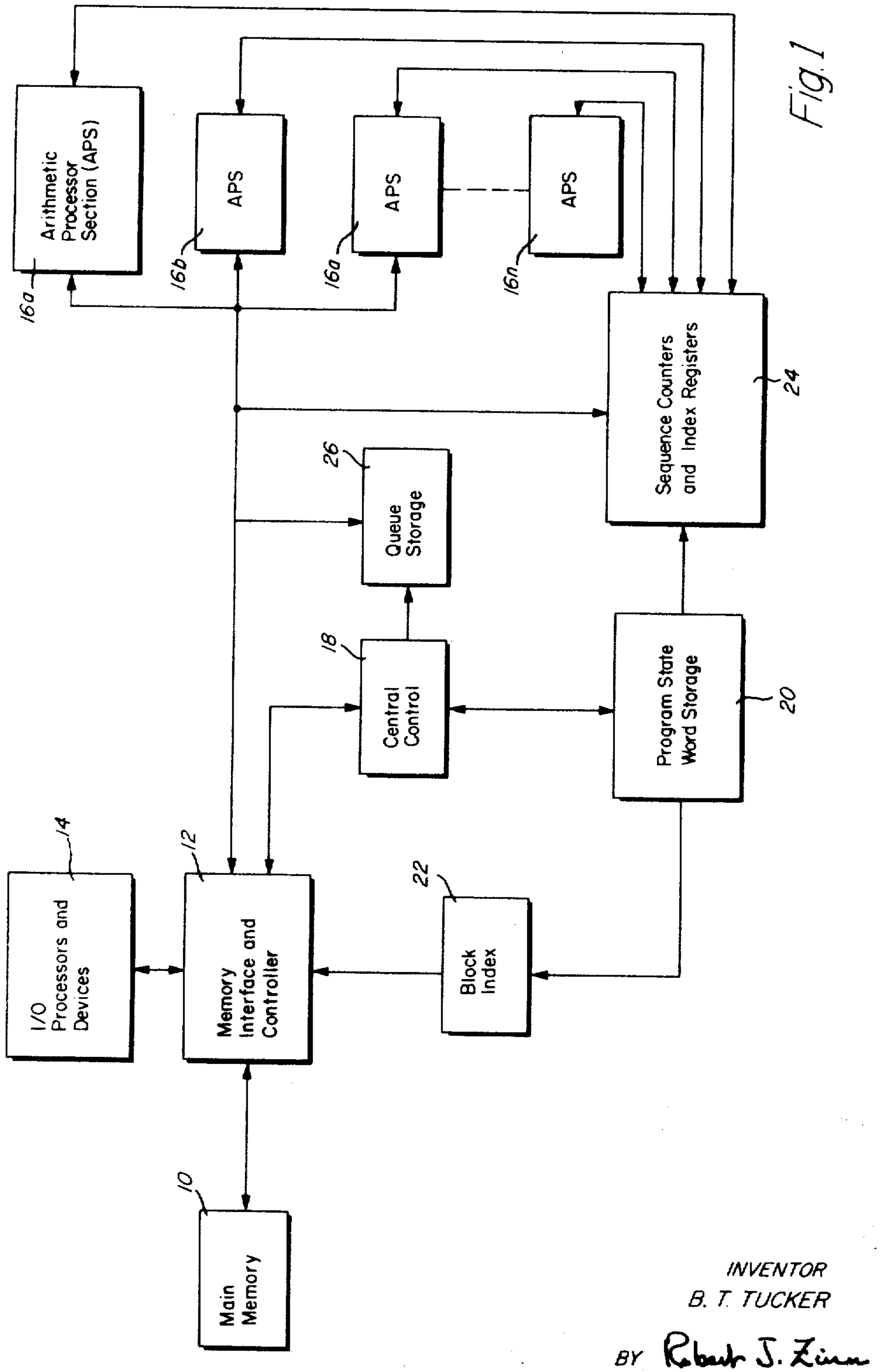
FIGURE 1 is a diagrammatic representation of a data processing apparatus incorporating the principles of the present invention.
Figure 2:
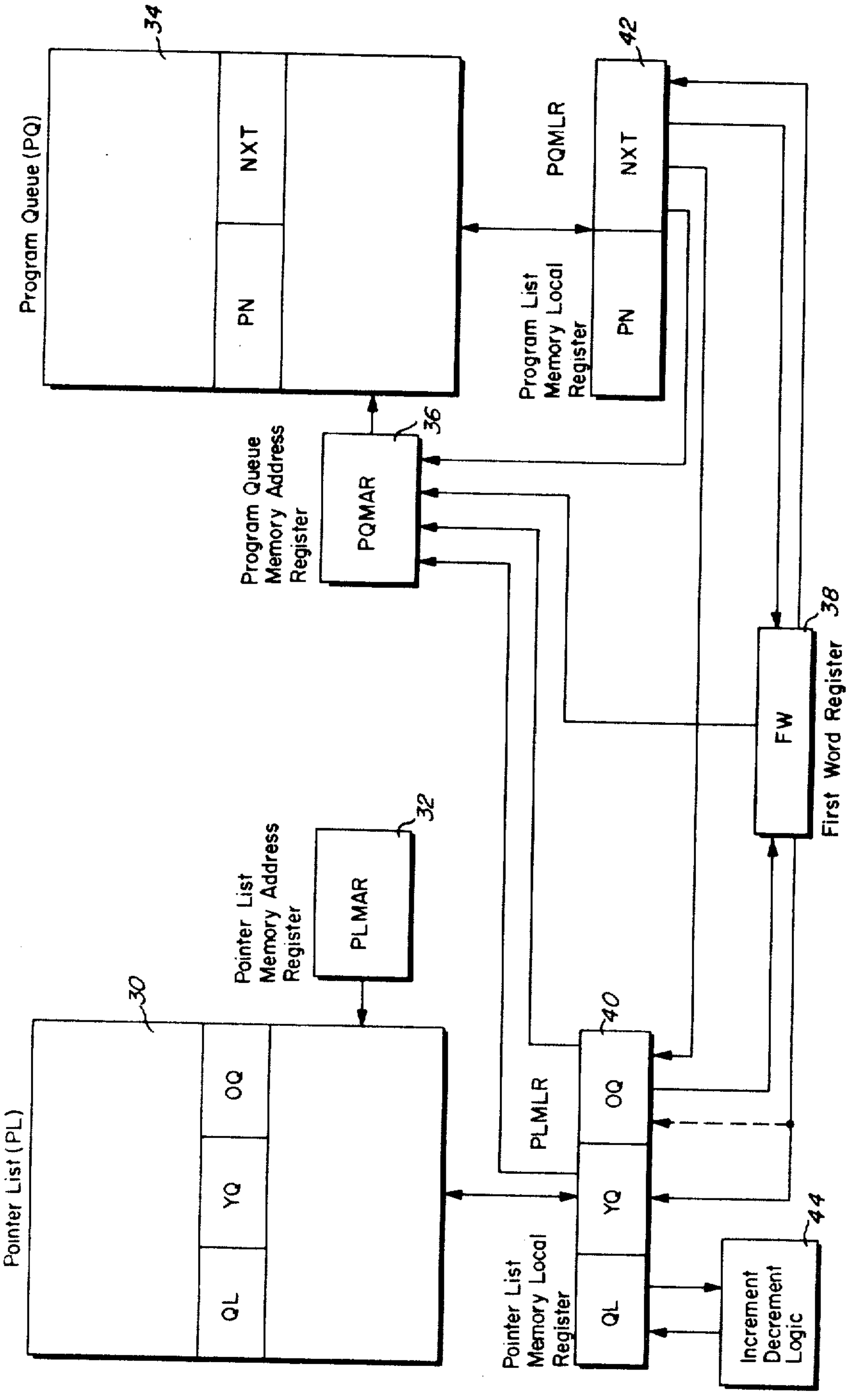
FIGURE 2 is a detailed representation of the Queue Storage of FIGURE 1.
Figure 3A:
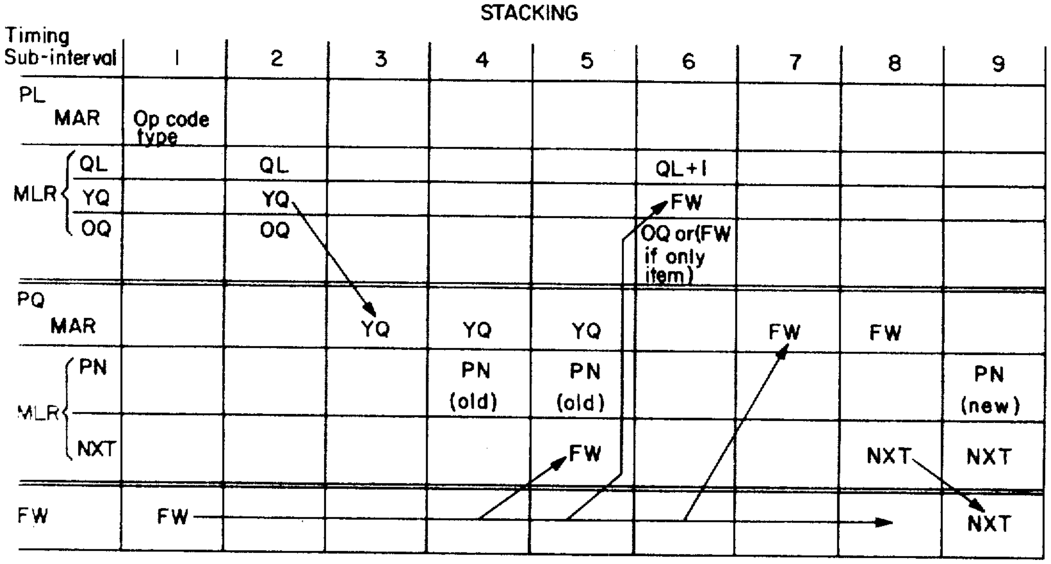

FIGURES 3A and B are timing charts depicting the time relationship between the various transfer operations realized in the circuitry of FIGURES 1 and 2 during the execution of stacking and unstacking operations therein.

Referring now to FIGURE 1, therein is shown in diagrammatic fashion the basic elements of a data processing system embodying the principles of the present invention. The numeral 10 identifies a main memory which may comprise a multiplane coincident current core storage unit of the form described in Patent 3,201,762, which issued to Henry W. Schrimpf on Aug. 17, 1965. In the conventional implementation of a coincident current core storage unit as described in the Schrimpf patent, access to the main memory would be provided through an associated address register, not shown, containing the address of the particular location within main memory being referenced. Information would then be transferred from the main memory 10 via a plurality of conventional sense amplifiers to a main memory local register, also not shown, from whence the information would be distributed to the various operational stages comprising the balance of the data processing system.

In more advanced systems, the main memory 10 may comprise a plurality of memory segments, each segment being provided with appropriate addressing and transferring means whereby several memory references may be in process at the same time. Although not specifically disclosed in the preferred embodiment of the present invention, it should be understood that the substance of the invention is equally effective in an implementation designed to process a plurality of requests directed to the various ones of a multisegmented memory. In particular, such an implementation would be effective in handling requests such as are generated by the plurality of peripheral devices normally associated with a data processing system.

In the preferred embodiment of the present invention, this latter function is effectively accommodated by the memory interface and controller 12. The memory interface and controller is designed to provide maximum simultaneity of communications between the memory 10 and the various operational portions of the data processing system including an I/O portion thereof indicated herein generally as member 14, and a plurality of arithmetic processor sections indicated herein generally as member 16. In more sophisticated systems, the function of the memory interface and controller 12 may be performed by a "satellite" computer specifically implemented to effect the interleaved addressing operations required. A memory organization capable of effecting simultaneous references is required in order to drive the arithmetic processor sections effectively since a high degree of concurrency in the plurality of processor sections presupposes that several instructions can be sent to the arithmetic units in an amount of time which is small compared to the average execution time of the processor sections. If only sequential memory accesses are permitted, the instruction in an arithmetic processor section would either be completed or close to completion by the time the next instruction arrived at that processor section, consequently, the degree of parallel operations in such a system would be minimized.

All operations in the present system are under the control and direction of a central control portion 18. It is the function of the central control portion to sequentially scan the plurality of programs stored in memory 10 and cause an instruction to be extracted from memory from those programs that are active and have an instruction waiting to be processed. The processing of an instruction involving arithmetic and logical operations occurs in two operative steps; namely, the instruction is first extracted from main memory whereafter the data portion is operated upon. The two phases of operation are conventionally designated as the extraction and execution phases respectively. The format of the instruction includes a first portion generally known as the Op code which defines the operation to be performed. Following the Op code, there are generally two or three address fields which contain the main memory address of the data being operated upon as well as the address to which the results are to be transferred.

In accordance with the broad philosophy of design characterizing the present multiprocessing system, each of the plurality of arithmetic processor sections **16*a*, 16*b*, 16*c* . . . 16*n* is designed to most efficiently perform a selective group of operations. Accordingly, each program instruction stored in the memory 10 is scanned by means associated with the central control member 18** immediately upon extraction from memory. Central control selects the appropriate processor section in accordance with the Op code of the instruction. Since the Op code defines the nature of the instruction, it follows that allocation to the various processors can be made on this basis since normally only one of the plurality of processors is designed to most efficiently execute this particular operation. In the case of an often-repeated instruction, more than one processor section may be implemented to effect the execution thereof. The operation of the system in such situations is discussed more fully below.

In order to increase the processing efficiency in multiprogramming systems, it becomes necessary to restrict the size of main memory so as to increase the access speed thereof. At the same time, steps must be taken to insure that the memory has available therein at all times those programs currently awaiting execution. Specific proposals which have been made to cope with this problem include dynamic program allocation techniques. In such systems, only small segments of the programs presently awaiting execution are maintained in main memory, the balance of each program being stored in readily accessible secondary storage devices.

An important consideration in the implementation of the dynamic program allocation technique is the ability to efficiently handle the "bookkeeping" duties involved in the continuous updating of the program segments in main memory. In the preferred embodiment of the present system, this function is performed by the program state word storage unit 20 in combination with the block index 22. In this respect, information is stored in the program state word storage unit 20 and the block index 22 which relates the addresses used in a program to the physical locations of the main memory containing the actual information. Thus, the program state word storage unit 20 stores information necessary to the execution of a particular operation. As such, the program state word provides the necessary program status information to the central control unit 18 necessary to the execution of operations therein. In addition, the program state word provides the pointer information required to link each program with its sequence and index registers located in member 24.

Because of the desire to simultaneously process a plurality of programs through the limited capacity of the main memory 10, it becomes necessary to allocate non-overlapping areas of the storage space to each of the active programs sharing space therein. However, main memory locations assigned to a particular program but no longer pertinent to the computations thereof, should be made available to the other programs sharing main memory. In the past it has been proposed to physically relocate the remaining programs in main memory as a particular portion of memory is freed; however, it becomes unfeasible to shuffle the various programs around within main memory unless the reallocation of memory is a relatively infrequent event. This problem has in part been met by the utilization of the block index represented as member 22, whereby the main memory is portioned into a plurality of equalised blocks. The various program segments are then assigned on the basis of their block number and it is the function of the state word storage unit 20 to provide information to the block index, member 22, to thereby enable the latter to maintain a known relationship between the block of information and its physical location in memory.

In order that each processor section may operate in essentially an asynchronous manner, means must be provided to enable any one of the processor sections to accommodate a request from any one of the plurality of programs. This function is provided for by member 24 which contains a sequence counter and index register exclusively reserved to each program, the total number of which corresponds to the total number of programs capable of simultaneous operation within the system.

In the operation of the system of FIGURE 1, the central control portion 18 sequentially scans the program state storage unit 20 causing an instruction to be extracted from memory for those programs that are waiting to be processed. The central control portion selects an arithmetic processor section in accordance with the Op code of the program instruction being processed. In this latter operation, the processor section selected is interrogated to see if an instruction can be processed immediately. In order to accomplish the interrogation, each arithmetic processor section is equipped with sensing means to compare the Op code in question with a list of operations comprising the repertoire of each particular processor section. Processor sections implemented to execute the operation defined by an instruction which is the subject of a current interrogation, will send back an affirmative response signal unless that unit is busy. In the latter event, the inquiry will be ignored and central control will assume after a period of time that the subunit is busy.

In the event that two or more processor sections are implemented to handle a particular type of operation, means are provided to guarantee that only one of the processor sections, capable of servicing the request, actually does so. The means provided for effecting this latter function are organized on a priority basis whereby recognition of a particular type request will always be extended to a first processor section provided it is not busy. This same relationship must exist between the second and third processor sections, etc. This form of dispatching organization eliminates the possibility that two or more processor sectons will honor a single request; and in addition, maintains the dispatching time an invariant which does not increase with an increased degree of complexity of the system. If all subunits of the type being requested by the current instruction are busy, the instructions are placed in the queue storage provided for in the data processing system of FIG. 1 by the member 26.

Upon completion of an operation in a particular processor section, the central control unit 18 is notified and the results are either sent to an intermediate storage location or a main memory location associated with the originating program. At this time, a test is made under the control of the central control unit 18 for a program request currently stored in queue storage 26 and awaiting execution in the processor section just freed. In the event that more than one program has a request for the freed processor section, recognition is extended to the program having the oldest queued request.

In addition to the "stacking" operation performed by queue storage when a specified instruction associated with a particular program is inserted into the queue, and the "unstacking" operation wherein the oldest queue request for a particular processor is transferred to the latter as it becomes available, an additional function of "program deletion" is performed to delete the queue storage of a processor request of a program being withdrawn prior to execution.

Before going further into the operation of the system of FIGURE 1, reference should be given to FIGURES 2 and 3 which describe in more particular detail those elements comprising the proposed queueing assembly which are considered pertinent to a complete explanation of the operation thereof. Referring first to FIGURE 2, therein is disclosed a first high speed scratch pad memory 30 hereinafter designated as the pointer list, PL. The pointer list is of a conventional design and may comprise a plurality of multiposition storage registers, addressed through the associated pointer list memory address register PLMAR, 32. Each one of the multiposition storage registers of the pointer list is associated with a separate one of the arithmetic processor sections. In the preferred embodiment of the present invention, the storage capacity of each multiposition storage register is sufficient to accommodate information including a portion entitled "queue length" QL, which records the number of requests entered for each processor; a portion entitled "youngest queue" YQ, which records the youngest or most recent request entered for an associated processor; and, a portion entitled "oldest queue" OQ, which records the oldest request entered for a particular processor.

The actual requests for the various processors are entered in a common program queue PQ, 34 which, like the pointer list, PL, comprises an addressable high speed scratch pad memory consisting of a plurality of multiposition storage registers. Since the program queue 34 serves the function of a common store for all program requests for the various processor sections 16*a* through 16*n*, it must be of sufficient size to accommodate the maximum number of program requests expected to be concurrently awaiting execution in the data processing system. The information content of the common program queue 34 must serve the function of identifying the program which is responsible for the entry as well as to identify the processor designed to accommodate the particular request. In this respect, each one of the multiposition storage locations of the program queueing device 34 contains a first portion PN which stores information directly identifying the requesting program. In addition, a second portion NXT, of each storage location of the program queue 34 indirectly identifies the associated processor. In this respect, the program queue address into which a request is currently being entered, is entered into the NXT portion of the program queue address identified by the then youngest queue entry associated with the particular processor section. This indirect identification of the processor necessitates the continuous updating of the contents of the program queue so as to indicate, by the insertion of information therein, that the latest request is the last of a string of requests for a particular processor section. Addressing of the program queue 34 is effected by means of the program queue memory address register PQMAR, 36 which alternatively receives its addressing information from the outputs of the pointer list 30, the program queue 34, or from a register 38 entitled the "first word register" FW.

The function of the first word register 38 is particularly pertinent to the successful practice of the present invention as it relates to the program queue 34. Thus, it has been stated above, that in addition to providing means for storing the identity of a requesting program, each location of the program queue also contains means for storing the queue address of the next location thereof to be associated with a particular processor. Since the next available program queue location is not definite at the time a particular request is being entered in the queue, this information must be supplied at a later time, i.e. at the time an actual request for the particular processor section is being entered. Accordingly, it is the function of the first word register 38 to continuously register the next available location in the program queue. It follows that the first word register 38 is also the source of the information required to update the NXT portion of the program queue address specified by the YQ portion of the pointer list location corresponding to the processor section which is the subject of a current request.

Since the program queue 34 is of the addressable type, and because of the fact that subsequent references to the contents of the program queue will be made with respect to an originating processor, steps must be taken to ensure that locations in the program queue which become available are refilled in such a manner that the most recently vacated location is the recipient of a current program request. This is necessary in order to preserve the chaining concept, since, if the voids in the queue are not filled as they are created, the empty locations would otherwise become inaccessible. Accordingly, it is the function of the first word register 38 to have at hand the address of the next available location in the program queue.

Associated with the output of pointer list 30 is a pointer list memory local register PLMLR, identified as member 40. Information enters the pointer list memory local register 40 in the same form in which it is stored in the pointer list memory 30. However, once in the PLMLR 40, the contents thereof are capable of being selectively altered. In this respect, the contents of either the OQ, YQ or QL portions of the pointer list memory local register may be directly substituted for by transferring information thereto from the various operational registers of the queueing assembly. In like manner, the output of the program queue 34 is connected to the input of a program queue memory local register PQMLR, indicated herein as member 42. The portion PN and NXT of a referenced program queue location are also capable of being modified while in the register 42. Increment-decrement logic, indicated generally in FIGURE 2 as member 44, is provided to selectively modify the contents of the queue length portion of the pointed list memory local register 40.

The manner in which the various registers comprising the queueing assembly of FIGURE 2, are updated follows a well-defined set of rules. The rules and their significance are best explained in terms of the stacking, and unstacking operations performed within the queueing assembly of FIGURE 2. In this respect, consideration is first given to the stacking operation which occurs when a processor request is generated by a particular program and the processor is found to be busy. In such instances, an entry is made in that portion of the pointer list in accordance with the set of logical equations defined in the following table:

STACKING $QL_{i+1}=QL_i+1$.
$YQ_{i+1}=FW_i$.
$OQ_{i+1}=OQ_i$ if $QL_i\neq 0$.
$OQ_{i+1}=FW_i$ if $QL_i=0$.
PN=Program number suppllied by the central control unit during time 9.
$NXT_{i+1}(YQ_i)=FW$.
$FW_{i+1}=NXT_i(FW_i)$.

For an explanation of the above logical equations, reference is now made to FIGURE 3A which outlines the steps involved in a typical stacking maneuver. For purposes of this explanation, the stacking operation is illustrated as extending over a succession of nine timing subintervals. It should be appreciated that the order in which the steps are executed is in no way critical to the practice of the present invention and in fact a more efficient implementation of the present invention would find various of these steps being simultaneously executed.

In subinterval 1 of the stacking operation, the appropriate location of the pointer list 30 is selected by loading a signal representation corresponding to the Op code of the requesting program into the pointer list memory address register 32. During the second timing subinterval, the contents of the referenced location within the pointer list 30 are transferred to the pointer list memory local register 32.

The YQ portion of the information transferred into the pointer list memory local register 40 is transferred during timing subinterval 3 to the program queue memory address register 36. The contents of this address in the program queue contains information relating to the last entry for the processor presently being referenced in the pointer list. The program queue address identified by the youngest queue is referenced at this time in order to complete the chaining of the requests for the particular processor. Thus, after allowing the information addressed in the program queue during subinterval 3 to settle into the program queue memory local register during subinterval 4, the contents of the first word register 38 are transferred into the NXT portion of the program queue memory local register 42 during subinterval 5. During this same timing subinterval, the current contents of the program queue memory local register are restored to the referenced location of the program queue 36.

At the time that the contents of the addressed location of the pointer list 30 were transferred to the pointer list memory local register 40, the QL portion thereof was transferred directly to the increment-decrement logic of member 44. Therein the digital representation is incremented to indicate the increase in queue length afforded by the program request currently being entered. During time subinterval 6, this information is returned to the QL portion of the pointer list memory local register 40. At the same time, the contents of the first word register 38 are transferred into the YQ portion of the pointer list memory local register. In an instance where a number of programming requests have already been entered for a particular processor section, the addition of the new request has no affect on the contents of the OQ portion of the pointer list. However, where there are no program requests currently awaiting the particular processor section, the contents of the OQ portion will be updated to the value currently being registered in the YQ portion to indicate that the oldest queue is also the youngest queue. The information being returned to the program list memory local register from the first word register 38 and the increment-decrement logic 44 is returned to the addressed location of the pointer list 30 during timing subinterval 6.

During timing subinterval 7, the contents of the first word register 38 is entered into the program queue memory address register 36 preparatory to the insertion of information into the program queue 34 to identify the currently requesting program. Thus, after the information located at the referenced location of the program queue is transferred into the program queue memory local register 42 during time subinterval 8, the content of the NXT portion thereof is transferred into the first word register 38 during time interval 9. At the same time the new program member is entered into the PN portion of the program queue memory local register 42 whereafter the information content of the latter is restored to the referenced location of the program queue 34. This completes the updating of the pertinent memory and register locations of the queueing assembly corresponding to the stacking operation.

In conducting an unstacking operation, reference is made to the following list of logical equations:

UNSTACKING $QL_{i+1}=QL_i-1.$
$YQ_{i+1}=YQ_i.$
$OQ_{i+1}=NXT_i(OQ_i).$
$NXT_{i+1}(OQ_i)=FW_i$
$FW_{i+1}=OQ_i$

Figure 3B:
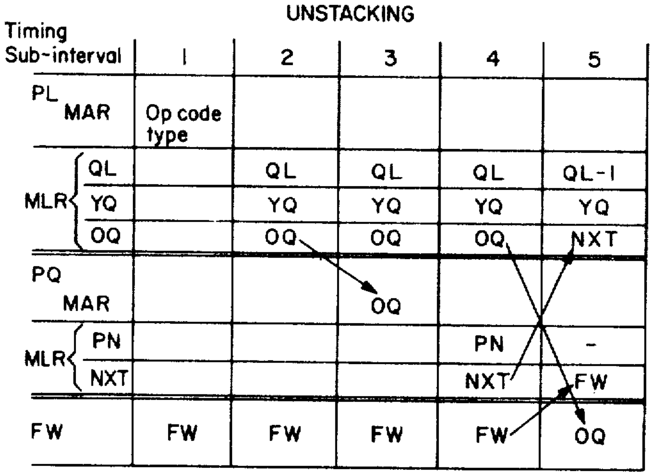

To aid in the interpretation of the above logical equations, as involved in the explanation of the unstacking operation, reference is hereinafter made to FIGURE 3B which discloses a suggested mode of modification to the memory and register locations comprising the queueing assembly. The first step after ascertaining that a particular processor has become free and is thus available to process the oldest queue request is the transfer of the contents of the particular location of the pointer list 30 to the pointer list memory local register 40. The address and transfer operations occur during timing subintervals 1 and 2. This portion of the unstacking operation establishes the identity of the oldest queue request for the processor just freed. Accordingly, the OQ portion of the pointer list memory local register 40 is transferred during timing subinterval 3 to the program queue memory address register 36 preparatory to the deletion of the program request from the queue and the execution of the requested operation in the freed processor. To accomplish this, the information content of the addressed location of the program queue 34 is transferred into the program queue memory local register 42 during timing subinterval 4. Thereafter the OQ portion of the pointer list memory local register 40 is transferred into the first word register 38 to indicate that the program queue address identified thereby is scheduled to receive the information associated with the next entry to the program queue 34. At the same time, the information content of the first word register 38 is transferred into the NXT portion of the program queue memory local register 42. The latter two phases of the unstacking operation have the effect of substituting the program queue address just released for that previously scheduled to be recognized as the next location in the program queue to receive an entry, while at the same time maintaining a chain of the available locations in the program queue by storing the previous contents of the first word register 38 in the NXT portion of the program queue address just released.

In order to complete the updating of the pointer list storage segment corresponding to the processor for which the oldest queue request is being released, the contents of the program queue memory local register 42 are transferred essentially simultaneously with the above two operations to the OQ portion of the pointer list memory local register 40.

It should be apparent from the foregoing explanation of the unstacking operation that the contents of the NXT portion of the program queue memory local register 42, as they are transferred to the OQ portion of the pointer list memory local register 40, relate to the original request for the particular processor, and that it is only upon completion of the unstacking operation that the second oldest request takes on the identity of the oldest queue.

In addition to the above manipulations, the contents of the QL portion of the pointer list memory local register 40 has been decremented and returned to the pointer list memory local register to indicate that the total queue length has been reduced by one through the honoring of the program request. Upon updating of the contents of the pointer list memory local register 40 and program queue memory local register 42, the contents thereof are restored to their respective locations in the pointer list 30 and program queue 34 as then established by the pointer list memory address register 32 and the program queue memory address register 36 respectively. The restoration of the information to the pointer list and program queue completes the unstacking operation.

If during the course of processing, a decision is made to remove a particular program prior to completion thereof, it then becomes necessary to delete any pending processor requests generated by that program. In effecting this operation, each of the various processors need not be entirely scanned provided that information is available identifying the program and the nature of the currently unexecuted instructions. In this respect, the availability of the instruction Op code uniquely identifies the processor section concerned. This information enables the direct addressing of the pointer list 30, resulting in extraction of the information associated with the processor section and the transfer thereof to the pointer list memory local register 40. The OQ portion of the pointer list memory local register 40 is then transferred to the memory address register 36 of the program queue. The information located in the referenced program queue location is examined in the program queue memory local register 42 wherein the program number portion is compared with the program number being searched.

Assume initially that the program number contained in the program queue memory local register 42 does not compare favorably with the program number being searched on, then the contents of the NXT portion of the program queue memory local register, identifying the program queue address of the next in the chain of program requests for the particular processor, is transferred into the program queue memory address register 36. This process of backtracking through the string of requests for the particular program, starting with the oldest request in the program queue, continues until a favorable comparison of the program number is effected.

Once the desired program request has been located and deleted, steps must be taken to rejoin the remaining requests to form a single chain. It should be recalled that the portion of the program queue entry entitled NXT, functions to reference the next request in the list of requests for each processor instruction. It becomes apparent that in order to successfully accommodate the recombination operation, it is necessary to modify the program queue entry identifying the program being deleted by substituting for the contents of the NXT portion thereof, the contents of the NXT portion of the program queue entry corresponding to the program being deleted.

It also becomes obvious that in deleting a program request a space is opened up in the program queue. In order to avoid gaps from being generated in the program queue this space must be identified as the next free location. This operation is effected by inserting into the first word register 38, the information located in the program queue memory address register 36 after a favorable comparison between the program numbers has been established. After this information is entered into the first word register 38, the original contents of the first word register are loaded into the NXT portion of the program queue location currently being identified as the next free word.

To complete the deletion operation, the value initially established as the queue length of the processor from whence the program order is being deleted, must be decremented to correctly represent the number of items remaining in the program queue 34 for this processor. This operation is readily accomplished in the decrement logic associated with the QL portion of the pointer list memory local register 40.

It will be apparent to those skilled in the art that other system configurations may well be incorporated within the principle of the present invention so long as the general operating characteristics are maintained compatible with the principle set forth above in connection with the operation of FIGURES 1 and 2. While in accordance with the provisions of the statutes, there has been illustrated and described the best forms of the invention known, certain changes may be made in the apparatus described without departing from the spirit of the invention as set forth in the appended claims; and that, in some cases, certain features of the invention may be used to advantage without a corresponding use of other features.

Having now described the invention, what is claimed as new and novel and for which it is desired to secure by Letter Patents is:

1. An electronic data processing apparatus characterized by the ability to simultaneously execute a plurality of programs in a pluralty of processor sections wherein the number of programs normally awaiting processing is large in comparison to the number of processor sections, each of said processor sections being designed to most efficiently execute a particular type of instruction, the combination comprising a central control portion for scanning processor requests generated in said plurality of programs and for directing each of said requests to the appropriate one of said processor sections, means to sense the operative status of a processor section for which a processor request has been generated, and means actuated upon detection of a busy condition in said processor section for which a processor request has been generated for storing unserviced requests therein, said last-named means including means operative upon the release of a particular processor section for referencing said stored requests and extracting the oldest request directed to said released processor section.

2. An electronic data processing apparatus comprising the combination of a plurality of processor sections each of which is designed to process selective types of program instructions, storage means for storing data and a plurality of programs, the number of said plurality of programs normally awaiting processing being large in comparison to the number of processor sections, a control portion connecting said memory portion to said plurality of processor sections, said control portion including means for scanning processor requests generated in said plurality of programs and for directing said requests to the appropriate processor sections, means to sense the operative status of a processor section for which a processor request has been generated, and means actuated upon indication of a busy status for said requested processor section to store an indication of said unserviced request, said last-named means including means operative upon release of any processor section for which a request has been generated for extracting the oldest request directed to said released processor section and to effect the execution thereof, said last-named means comprises a common queueing device including a plurality of first means each of which uniquely represents the activity of a respective processor section, second means for storing data indicative of the order in which requests are generated in said plurality of programs for said plurality of processor sections, and third means identifying the particular storage area of said second means scheduled to receive the next processor request.

3. An electronic data processing apparatus characterized as a multiprocessing apparatus by an ability to effect concurrent operations in a plurality of processor sections, comprising the combination of first storage means, said first storage means including a plurality of segmented storage areas corresponding in number to the number of processor sections comprising said multiprocessing apparatus, each of said storage areas of said first storage means including means for storing data in respective segments thereof identifying a particular one of said processor requests as the youngest request directed to a particular processor, said last named means further including means identifying a particular one of said processor requests as the oldest request directed to a particular processor, said last named means further including means for identifying the total number of processor requests directed to said plurality of processor sections; second storage means including a plurality of segmented storage areas corresponding to the maximum number of programs expected to be concurrently awaiting execution in said multiprocessing apparatus, each of said storage areas of said second storage means including means for storing data in respective segments thereof indicating the order in which requests are received from said plurality of programs and the address of the next one of said storage areas of said second storage means scheduled to be recognized; third storage means identifying the storage area of said second storage means scheduled to receive the next program request; and, means connected to said first, second and third storage means for automatically updating the contents thereof during the course of said multiprocessing operations.

4. In a common queueing assembly adapted to store requests from a plurality of program sources being directed to a lesser number of processor sections, the combination comprising first means for storing information associated with each of said processor sections, said information content of said first means including the identity of any one of a plurality of storage locations for storing information pertinent to a particular program request, each one of said plurality of storage locations including a first portion for storing the identity of a program requesting a processor section and a second portion for storing information identifying another one of said plurality of storage locations, additional means for storing information identifying the next one of said plurality of storage locations scheduled to store information pertinent to a program request being directed to any one of said processor sections, and means actuated upon receipt of a request for a particular processor section to reference a particular one of the plurality of storage locations identified by the information contents of the first means associated with said particular processor section and to store the contents of said additional means therein, the contents of said additional means being thereafter used to reference said particular one of said plurality of storage locations scheduled to store information pertinent to said program request, and means for storing the identity of the requesting program in the first portion of said referenced location.

5. In a common queueing assembly wherein information originating in a plurality of sources and being directed to common ones of a plurality of users is stacked and unstacked in an asynchronous manner, the combination comprising first means including a plurality of storage segments corresponding in number to the maximum number of sources expected to be concurrently supplying information to said plurality of users, each of said plurality of storage segments of said first means adapted to store information identifying the originating source as well as information identifying the next oldest source supplying information to a user in common therewith; second means including a plurality of storage sections each of which is associated with a particular one of said plurality of users, each of said storage sections of said second means including means for storing information identifying the youngest source supplying information to the user associated therewith; third means including means for storing information identifying the storage segment of said first means scheduled to next store information identifying a newly activated source; means to sense the contents of a particular one of said storage sections of said second means and to reference a particular one of said storage segments of said first means in accordance with the contents thereof, means for storing the contents of said third means in that portion of said referenced one of said storage segments of said first means identifying said next oldest source, the contents of said third means being thereafter used to reference said particular one of said storage segments of said first means scheduled to next store information identifying said newly activated source, and means for storing in said referenced location the identity of said newly activated source.

6. In a signal storing and transferring apparatus adapted to store signals originating with a plurality of sources and independently directed to a lesser number of users, the combination comprising a plurality of storage locations, each of said storage locations further comprising first and second signal storing portions, one of said signal storing portions adapted to store information identifying a particular one of said plurality of signal sources, the other of said signal storing portions adapted to store information identifying another one of said plurality of storage locations having information stored therein directed to the same user, additional means to store information identifying the next one of said plurality of storage locations scheduled to store a signal representation emanating from the next signal source to request storage space, and means operative upon recognition of a request by a particular user to delete the informational content of the first portion of said storage location associated therewith and to interchange the informational content of said second portion with that in said additional means whereby said storage location just emptied is rescheduled so as to be the first to receive the signal representation from the next signal source requesting storage space.

7. An electronic data processing apparatus characterized by the ability to simultaneously execute a plurality of programs and a plurality of processor sections wherein the number of programs normally awaiting processing is large in comparison to the number of processor sections, each of said processor sections being designed to mos efficiently execute a particular type of instruction, th combination comprising a central control portion fo scanning processor requests generated in said plurality o programs and for directing each of said processor request to an appropriate one of said processor sections, mean to sense the operative status of a processor section fo which a processor request has been generated, and mean actuated upon detection of a busy condition in said proc essor section to store said processor requests, said last named means further comprising first means for storin information associated with each of said processor sec tions, said information content of said first means includ ing the identity of any one of a plurality of storage loca tions for storing information pertinent to a particula processor request, each one of said plurality of storag locations including a first portion for storing the identit of a program requesting a particular processor section an a second partion for storing information identifying an other one of said plurality of storage locations havin information stored therein directed to said particula processor section, additional means to store informatio identifying the next one of said plurality of storage loca tions scheduled to store a request emanating from th next program to request a processor section, and mean operative upon recognition of a processor request by sai particular processor section to delete the informationa content of said first portion of said storage location asso ciated therewith and to interchange the informationa content of said second portion with that in said additiona means whereby said storage location being emptied i rescheduled so as to be first to receive the next processo request from said plurality of programs.

References Cited

UNITED STATES PATENTS

| | | | |
|---|---|---|---|
| 3,229,260 | 1/1966 | Falkoff | 340—172.5 |
| 3,242,467 | 3/1966 | Lamy | 340—172.5 |
| 3,297,999 | 1/1967 | Shimabukuro | 340—172.5 |
| 3,328,772 | 6/1967 | Oeters | 340—172.5 |
| 3,346,851 | 10/1967 | Thornton et al. | 340—172.5 |
| 3,348,210 | 10/1967 | Ochsner | 340—172.5 |
| 3,349,375 | 10/1967 | Seeber et al. | 340—172.5 |
| 3,351,918 | 11/1967 | Levy | 340—172.5 |

ROBERT C. BAILEY, *Primary Examiner.*

J. P. VANDENBURG, *Assistant Examiner.*